United States Patent [19]

Scandella

[11] 4,292,741
[45] Oct. 6, 1981

[54] UNIVERSAL LEVEL VIAL HOLDER

[75] Inventor: Louis Scandella, Marnay, France

[73] Assignee: Stanley Mabo, S.A., Besancon, France

[21] Appl. No.: 123,193

[22] Filed: Feb. 21, 1980

[30] Foreign Application Priority Data

Feb. 26, 1979 [FR] France .................... 79 05430
Jan. 14, 1980 [FR] France .................... 80 00944

[51] Int. Cl.³ .............................................. G01C 9/28
[52] U.S. Cl. .................................................... 33/379
[58] Field of Search ................................ 33/379, 381

[56] References Cited

U.S. PATENT DOCUMENTS 1,689,982 10/1928 Vogel ...................................... 33/381

FOREIGN PATENT DOCUMENTS 1147408 4/1969 United Kingdom ................. 33/381

Primary Examiner—Charles E. Phillips
Attorney, Agent, or Firm—Prutzman, Kalb, Chilton & Alix

[57] ABSTRACT

A holder for the setting of a level vial on the web of extruded or molded spirit levels, which comprises a base plate, the back wall of which is fixed to the level web, said base plate extending upwards along its edges through two symetrical parallel branches, the ends of which presenting a transversal perimeter whose center is set over relating to the plane of the base plate, said perimeter being provided with support means and said base plate being provided with means for locking the holder to the level web.

9 Claims, 6 Drawing Figures

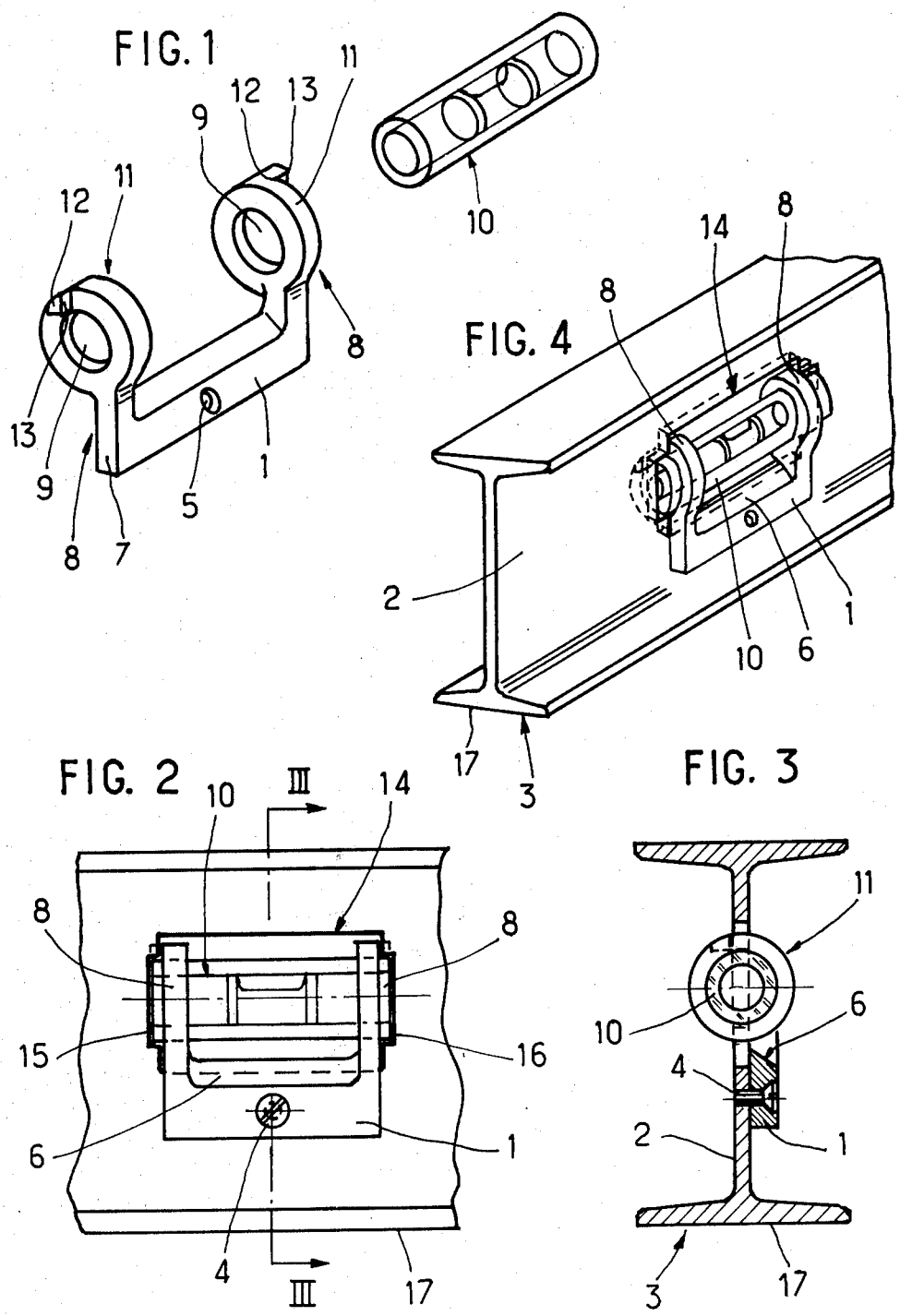

UNIVERSAL LEVEL VIAL HOLDER

The present invention relates to a holder for the setting and fixing of level vials, more particularly on extruded or molded levels.

If manufacturing processes allow at the present time the production of high quality vials at a lower price, taking into account the suppression of most of the manual manufacturing stages, its setting and fixing on the level web still require several successive manual operations, most of them being critical.

When using brittle level vials, the properly so called setting stages are followed by the placing of flat transparent shockproof structures.

These structures are built up upright to the level vial on each of the two faces of the level web.

The level vial is kept close to the level web through its ends, nested in vertical slots but horizontaly free.

In order to avoid lateral shifting, the level vial is commonly fixed in position by means of ledges or ribs extending from the back wall of each of the transparent structures.

The fixation is also performed by screwing the ends of the level vial on the level web.

These further fitting and immobilizing operations burden the cost price of the levels.

An object of the invention is to remove all the intermediate operations by providing a holder for the setting and fixing of a level vial on a level web.

The holder according to the invention comprises a base plate fitted with means for the locking on the level web, said base plate extending upwards through two parallel symmetrical branches, the ends of which enclose the ends of the level vial allowing its holding and immediate positioning, by a single operation, in the correspondant slot of the level web.

Support means are provided on the branches of the holder, avoiding the locking of the holder on the level web in two or more places.

According to a preferred embodiment, there will be provided multiple support places on the branches of the holder.

The web of the holder indeed, generally made of synthetic material, shows a slight flexibility, when pressing on the level vial endwise relating to the level web plane from the side of the base plate. Although this does not constitute a real disadvantage concerning the use of the level, it is nevertheless more advisable to avoid that, in a so precise measure instrument, the main part thereof may be moved, which could in course of time induce a slight disadjustment.

Thus there is provided a holder for a level vial wherein the support means consist on each of the two perimeters in a pair of stop-pins facing each other, extending outwards relating to the plane of the perimeters and upright to said plane.

Preferably the stop-pins will be formed with the holder and will have walls facing each other, parallel to the plane of the base plate.

Thus, the holder is set on the level web and is maintained in three places:
- on one side of the level web through one stop-pin of each perimeter;
- on the other side of the level web respectively through the other stop-pin of each perimeter, and through the means for locking the base plate to the level web.

The holder is no more free from moving.

The main advantage of the invention lies in the ease for setting the level vial and its holder. This is performed by a sole operating stage, and the position of the level vial is perfect as soon as the holder has been set onto the level web.

Further to the easy assembling device, there is no need for any adjustment. The good resistance of the holding and the universal possible use of this holder, that can be adapted to all kinds of linear level vials of various cross-sections, are also to be pointed out.

The invention will be best understood from the following description, illustrated in the accompanying drawings in which:

FIG. 1 is a perspective view of the holder according to the invention and of a cylindrical vial therefor;

FIG. 2 is a side view in elevation of the holder and the vial fixed on a spirit level with a profiled web;

FIG. 3 is a sectional view taken along the line III—III of FIG. 2;

FIG. 4 is a perspective view of the vial and of the holder fixed on a spirit level with a profiled web;

Figure 5:
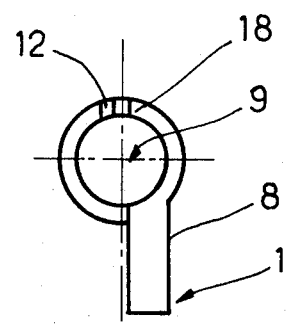
FIG. 5 is a side view of a holder with several stop-pins.

The general shape of the vial holder according to the invention is illustrated on FIG. 1, for use with a cylindrical vial.

The holder comprises a base plate (1), for instance rectangular. The back flat wall of the base plate is kept close to the web (2) on the level (3).

This base plate is provided with means for locking it to the level, for instance a screw (4) extending through hole and cup (5).

The base plate ends at its upper end and in its median part by a bevelled edge (6) in order to let the sight free. On each side of the base plate the edges (7) extend through symetrical parallel branches (8).

Each of them is shaped at its end according to a transversal perimeter (9) suitable to the cross-section of the vial (10). For instance when a cylindrical vial is used, the perimeter, as shown on FIG. 1, is a ring.

The rings hold the vial at its ends in a close contact, in order to avoid any casual slipping during the setting operation.

The rings are each provided with a pin (12) formed with the ring, extending outwards, upright to the plane of the rings.

Each of them has a supporting face (13) parallel to the backwall of the base plate, said supporting face (13) being located at a distance of the back wall equal to the thickness of the level web.

The two pins (12) are located in the same longitudinal plane. They are at one and the same time supporting means and abutments for the holder in relationship with the backwall of the level web. The holder is thus maintained on each side.

The holder and its vial are set in a rectangular slot (14) provided on the level web. This slot is fitted with two lateral rectangular-shaped slots (15,16) facing each other, the small sides thereof being exactly parallel to the base (17) of the level, or upright to the same in the case of a vial for testing verticality.

The width of slots (15,16) is preferably equal to the outer diameter of the vial. The rings maintain the vial exactly in the slots.

The holder according to the invention is manufactured in a plastic material, or molded (especially for metal), with a sufficient stiffness to be shockproof.

The operating stages for setting a vial on a level web are then very easy.

The vial is set on its holder. Both are engaged in slot (14) from the back face of the level web, the base plate being led forwards. Then the rings are adjusted in slots (15,16), and the holder is rotated in order to apply the base plate (1) close to the level web.

The holder and the vial are then exactly set, and they are definitively fixed on the level web through, for instance, screw (4).

Figure 6:
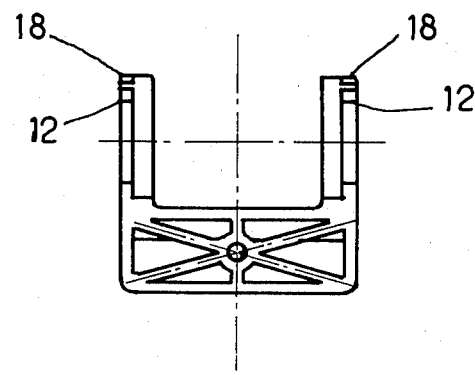
FIG. 6 is an elevation of the internal face of the holder of FIG. 5.

FIGS. 5 and 6 illustrate another embodiment, wherein each pin (12) is facing another pin (18) extending upright to the plane of the branches (8) and outwards to the holder.

For an easier manufacturing and a best design, pins (18) will extend on the whole length of edges of the branches (8) and the base plate (1).

Each pair of pins (12), (18), facing each other through walls parallel to the plane of the base plate, determine a slot the width of which is slightly higher than the thickness of the level web, in order to allow a setting as described hereinbefore.

I claim:

1. A holder for mounting a level vial within a slot in a web of an extruded or molded spirit level said holder comprising an elongated base plate having a generally planar back wall engageable with one face of the level web and a pair of support legs extending upwards from said base plate, each of said support legs having an end provided with a transversal perimeter for receiving said vial for positioning in said slot, said perimeters being spaced by a distance less than the longitudinal dimension of said slot and having a common axis offset from the plane of said back wall, said perimeter being provided with support means spaced laterally from said back wall approximately a distance equal to the thickness of said web and adapted to contact the opposite side of said web from that contacted by said back wall for supporting said holder on said level and said base plate being provided with means for locking the holder to the level web.

2. A holder according to claim 1, wherein the inner shape of the perimeter corresponds to the cross-section of the vial.

3. A holder according to claim 2, wherein the perimeters are rings, with a circular inner shape.

4. A holder according to claim 1, wherein the support means includes a pair of stop-pins extending outwards relating to the plane of the perimeters and upright to said plane.

5. A holder according to claim 4, wherein the support means includes a pair of stop-pins facing each other on each perimeter, extending outwards relating to the plane of the perimeters and upright to said plane, one stop-pin of each pair confronting said one face of the level web engageable by the base plate, the other stop-pin confronting the opposite face of said web.

6. A holder according to claim 5, wherein the stop-pins located on the same side as the base plate relating to the level web extend on the whole length of the support legs and of the base plate.

7. A holder according to claim 4, wherein the stop-pins are integral with the holder, and wherein the stop-pins are provided with supporting faces for engaging the level web when locking the holder.

8. A holder according to claim 7, wherein the distance between the front of the supporting faces of the stop-pins located on the other side of the level web relating to the base plate and the plane of the backwall of said base plate is equal to the thickness of the level web.

9. A holder according to claim 1, wherein the means for locking it to the level web consist in a screw.

* * * * *

UNITED STATES PATENT OFFICE
CERTIFICATE OF CORRECTION

Patent No. 4,292,741          Dated October 6, 1981

Inventor(s)     Louis Scandella

It is certified that error appears in the above-identified patent and that said Letters Patent are hereby corrected as shown below:

Column 4, lines 32 and 33, delete the following:

"located on the other side of the level web relating to the base plate"

Signed and Sealed this

Twenty-third Day of February 1982

[SEAL]

Attest:

Attesting Officer

GERALD J. MOSSINGHOFF

Commissioner of Patents and Trademarks